Aug. 23, 1966　　　　　K. WINKLER　　　　　3,267,570
METHOD FOR MEASURING AND CONTROLLING THE WIDTH OF THE
WELDING GAP IN THE PRODUCTION OF HELICAL SEAM PIPE
Filed Jan. 16, 1963
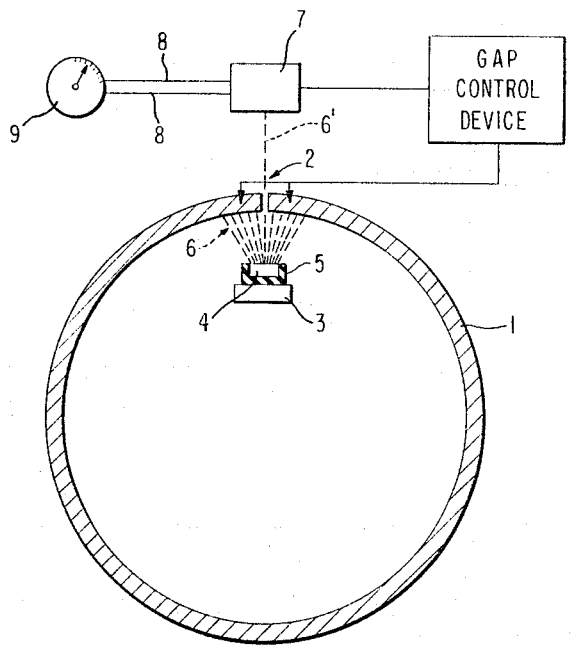
INVENTOR
KURT WINKLER
BY　　Dicke & Craig
ATTORNEY

United States Patent Office 3,267,570
Patented August 23, 1966

3,267,570
METHOD FOR MEASURING AND CONTROLLING THE WIDTH OF THE WELDING GAP IN THE PRODUCTION OF HELICAL SEAM PIPE
Kurt Winkler, Waldshut, Upper Rhine, Germany, assignor to Driam Société Anonyme, Vaduz, Liechtenstein
Filed Jan. 16, 1963, Ser. No. 251,899
Claims priority, application Germany, Jan. 18, 1962,
D 37,949
2 Claims. (Cl. 29—477.7)

The present invention relates to a method for measuring and controlling the width of the welding gap in the production of helical seam pipe and to the apparatus for carrying out this method.

In the production of metal pipes with welded helical seams from strip stock in pipe making machines the necessity usually occurs that the width of the welding gap for producing the helical seam has to be controlled at a point in front of and as closely as possible from the welding point so as to be constant as possible and thus to attain a welding seam of a uniform quality. Variations in the width of the welding gap may have different causes but primarily they are due to irregularities in the strip stock which is being used.

These variation in the width of the welding gap must first be measured in some manner. For this purpose, mechanical measuring devices were previously used which scan the positions of the two adjacent edges of the strip relative to each other in front of the welding point. This scanning operation and its results may be indicated by mechanical, electrical, or other means and may also be utilized for an automatic control of regulating elements, for example, for changing the feeding angle of the metal strip to the forming tool. The disadvantages of these known measuring means which preferably operate mechanically are generally known. Apart from the fact that their measuring accuracy is not what it should be, it is also difficult to arrange them within the continuously narrowing welding gap. These disadvantages are especially prevalent in a continuous operation and under the conditions which they occur within the welding gap as the result of temperature influences, dust, and so forth.

It is an object of the present invention to carry out the measurements of the width of the welding gap by employing a suitable radioactive radiation. Especially suitable for this purpose is, for example, the beta radiation of an isotope Sr 90 which may be screened off by very thin metal walls. This isotope Sr 90 is preferably arranged at the inside of the pipe to be welded in such a manner that a sharply defined bundle of rays falls through a small window aperture upon the welding gap in front of the welding point. On the outer side of the pipe a Geiger counter is provided which has an inlet window of a suitable size and shape and is located at a point in the direction of the bundle of rays. If the welding gap is completely closed, no beta rays can fall upon the Geiger counter which will then indicate an amount of radiation of zero. If the welding gap opens up only a very small amount, the beta rays penetrate through it and the Geiger counter will indicate an amount of radiation which is directly in proportion to the size of the welding gap. Small lateral displacements of the welding gap above the Geiger counter do not affect the results of the measurements. The amount of radiation which is measured by the Geiger counter is amplified in the conventional manner and then indicated by an electrical measuring and indicating instrument. These electrical impulses may also be utilized directly for controlling the operation of the helical seam pipe making machine.

While any suitable apparatus may be used for the purposes of the present invention, reference will now be made to the accompanying drawing which shows, in the single figure thereof, a measuring set-up that may be used for purposes of the present invention.

In the accompanying drawing which shows, for purposes of illustration only, in a schematic manner a measuring set-up in accordance with the present invention, reference numeral 1 designates therein a pipe provided with a welding gap generally designated by reference numeral 2. A container 5 accommodating a radio active isotope 4 of any suitable type is arranged on a carrier or support 3. When no measurements are made, the container 5 is covered by means of a lead cap (not illustrated). The radio active isotope emits rays 6 which are capable of penetrating the walls of pipe 1 only where the welding gap 2 exists. The portion of the isotope rays 6 passing through the pipe 1 is designated by reference numeral 6'; even though several rays pass through the welding gap or slot 2, only a single ray 6' is shown for sake of simplicity. The rays 6' passing through the welding gap 2 impinge on the inlet window of correspondingly large dimension of a Geiger counter tube 7, of any conventional construction which renders visible the intensity at an indicating apparatus 9 by way of lines 8. If so desired, an amplifier may be accommodated in the indicating apparatus 9 as is well known in the art. Additionally, the produced pulses may also be utilized in any known conventional manner for effecting automatically the control of the installation for producing helical welding seams on pipes. Since control apparatus which use pulses to effect a control, for example, by well known servo mechanisms are known per se in the art, a detailed description thereof is dispensed with herein, the single figure of the drawing illustrating diagrammatically a connection from the tube 7 to a conventional gap control device and from the latter to both sides of the gap 2.

Even though the present application is intended primarily for measuring the width of the welding gap in installations for producing helical welding seams in pipes, the accompanying figure illustrates, for sake of simplicity, the measuring apparatus with a pipe having a longitudinal welding seam as the present invention is equally applicable thereto.

It is clearly evident that the new method of measuring and controlling the width of the welding gap in a helical seam pipe making machine by measuring the amount of radiation passing through the gap is far superior to the method and means which have previously been used for this purpose. Especially the constant accuracy of the measurements which are attainable by this method and its nonsusceptibility to any mechanical malfunction or breakdown are remarkable. It permits exact measurements of the width of the welding gap to be made continuously down to a width of zero which previously has never been possible, and it therefore also permits the operation of the pipe making machine to be carried out continuously with a welding gap as small as desired and also of a constant width since the slightest deviations can be immediately ascertained and accurately measured and therefore also be immediately corrected.

Having thus described my invention, what I claim is:
1. A method for continuous measurement and control of the changeable width of the welding gap during the manufacture of pipes with welded helicoidal seams, comprising the steps of subjecting that portion of said welding gap closely adjacent to the welding spot to the penetration therethrough of the rays of a radioactive isotope, measuring the fluctuations in quantity of said rays in response to changes in said width, and utilizing said fluctuations for the control of said width.

2. In the manufacture of pipes with a welded helicoidal seam subject to width changes during said manufacture, a method for the measurement and control of said changes in the welding gap in said seam, comprising the steps of placing a radioactive isotope at one side of said welding gap, emitting a bundle of rays from said isotope through said gap, the amount of radiation passing through said gap being changeable in response to said width changes, measuring said changeable amount of radiation arriving at the other side of said gap, and further including the step of controlling the width of said welding gap in accordance with the values of the measurements of said changeable amount of radiation.

References Cited by the Examiner

UNITED STATES PATENTS

| | | | |
|---|---|---|---|
| 2,487,628 | 11/1949 | Aller | 88—14 |
| 2,587,056 | 2/1952 | McElroy | 250—65 |
| 2,859,349 | 11/1958 | Bradley | 250—83.3 |
| 2,905,825 | 9/1959 | Black | 250—83 |
| 2,965,758 | 12/1960 | Malick | 250—83.3 |
| 3,102,960 | 9/1963 | Sick | 88—14 |

RALPH G. NILSON, *Primary Examiner.*

J. W. LAWRENCE, *Assistant Examiner.*